United States Patent [19]

Schave

[11] 4,255,055

[45] Mar. 10, 1981

[54] SURFACE INSPECTION SYSTEM FOR DETECTING FLATNESS OF PLANAR SHEET MATERIALS

[75] Inventor: Richard D. Schave, Perrysburg, Ohio

[73] Assignee: Libbey-Owens-Ford Company, Toledo, Ohio

[21] Appl. No.: 38,082

[22] Filed: May 11, 1979

[51] Int. Cl.$^3$ .............................................. G01B 11/30
[52] U.S. Cl. ..................................... 356/371; 356/239
[58] Field of Search ........................ 356/239, 371, 376

[56] References Cited

U.S. PATENT DOCUMENTS

| | | | |
|---|---|---|---|
| 3,667,846 | 6/1972 | Nater et al. | 356/371 |
| 3,788,750 | 1/1974 | Maltby | 356/239 |

Primary Examiner—Bruce C. Anderson
Attorney, Agent, or Firm—Collins, Oberlin & Darr

[57] ABSTRACT

An inspection system for detecting the flatness of planar glass sheets or other materials having reflective surfaces by observing areas of preselected size on the surfaces. The system includes a collimated beam of light directed toward the surface of the sheet material wherein the collimated beam is split into two pairs of beams superimposed one upon the other at right angles for indicating contour in two directions along perpendicularly oriented axes of the observed area. The indication of flatness is obtained by presetting the spacing between the beams of each pair of beams directed against sheet material and noting any change in the spacing occurring between the reflected beams of each pair of beams. A light beam detector, positioned in the path of each of the pair of reflected beams so as to intercept the reflected beams, detects any change in spacing occurring between the beams of each pair of reflected beams and generates a series of signals in response thereto. The signals from the light beam detectors are processed and integrated into a predetermined logic indicative of the contour of the observed area of the sheet surface for comparison to a like logic for a prescribed surface flatness.

11 Claims, 5 Drawing Figures

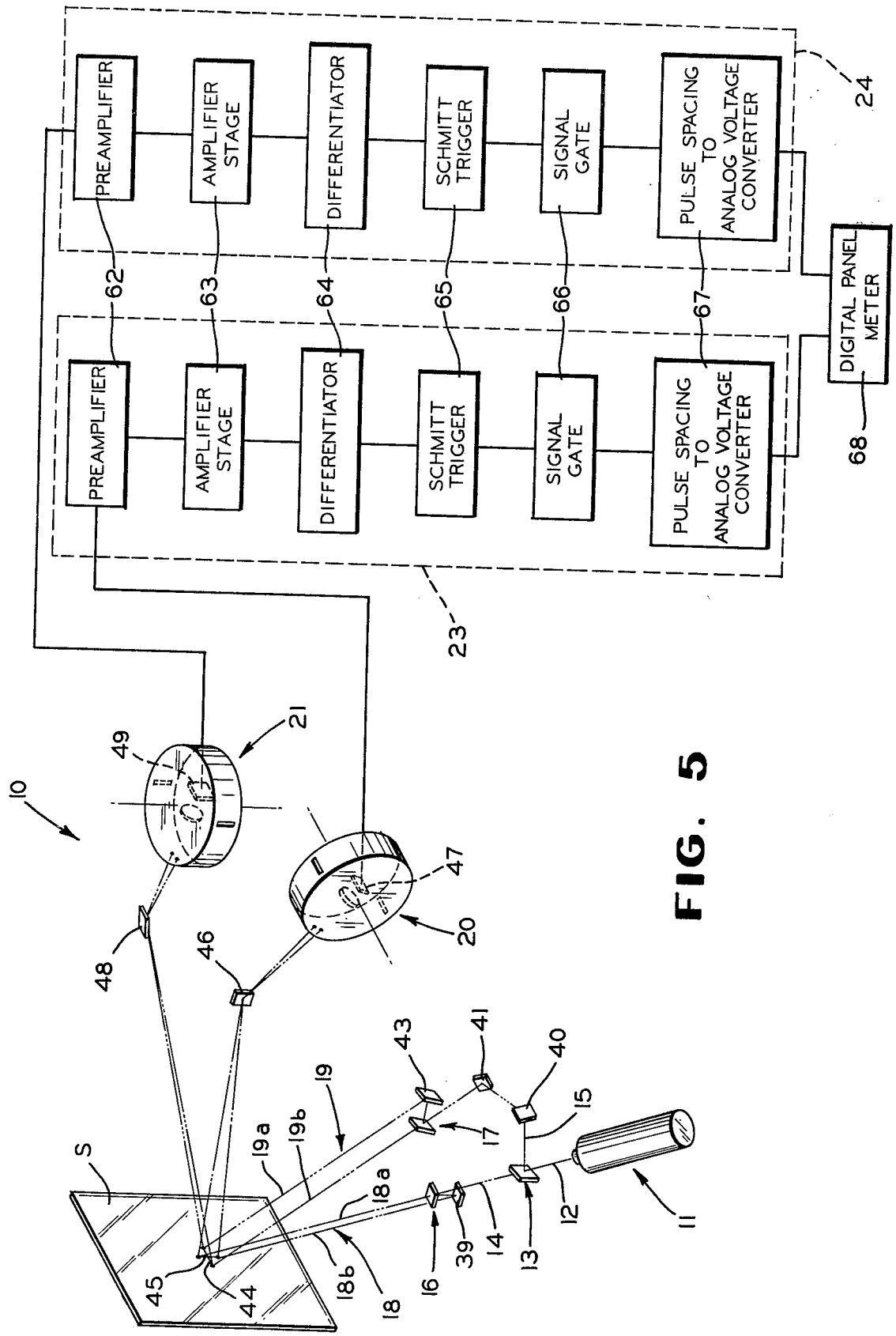

SURFACE INSPECTION SYSTEM FOR DETECTING FLATNESS OF PLANAR SHEET MATERIALS

BACKGROUND OF THE INVENTION

1. Field of the Invention

The invention generally relates to the evaluation of relative flatness of transparent or reflecting sheet material and more particularly to an inspection system for measuring the flatness quality of glass sheets by a uniform standard in a logic indicative of the surface flatness for comparison to a like logic for a prescribed surface flatness.

2. Description of the Prior Art

In the past, visual methods have been employed in evaluating the flatness quality of planar glass surfaces including the use of a device commonly known as an "optical flat". As is known, an optical flat is a tool for the optical inspection of the flatness of a surface. The tool consists of a polished piece of clear glass ground to have flat parallel surfaces, which is placed on the surface to be inspected. When the glass is illuminated with a monochromatic light, variations in the direction and spacing of light bands (known as the interference pattern), are produced by the light reflected from the surface being inspected and that reflected from the lower surface of the optical flat. The interference pattern will reveal any variations in the thickness of the film of air between the inspected surface and the optical flat. The interference pattern may be composed of any number of light and dark bands known as fringes. The utility of such a method as an ultimate tool in determining flatness quality of glass sheets is limited, however, in that human judgment is involved in determining whether a particular sheet of glass falls within established flatness quality limits. One factor which limits such a visual inspection system is the resolution ability of the human eye. Also, such devices are not satisfactory for factory operation on a production basis in that they tend to be susceptible to dirt on them and/or the glass being inspected, which consequently compounds an erroneous visual reading due to the human element. In order to permit establishment of uniform standards for the grading of glass into flatness categories suitable for different end uses independent of visual inspection and its attendant human variation, a procedure which eliminates the visual inspection of planar glass for flatness has long been sought.

Heretofore, inspection systems such as shown in assignee's U.S. Pat. No. 3,788,750, issued on Jan. 29, 1975, have been used to detect vision distortion or optical quality by observing the lens power and width of defects which appear as positive and negative lenses on the surfaces of a reflecting sheet material. As shown therein, components similar to the type used in the instant invention are employed to observe conditions which cause visual distortion in flat glass sheets occurring as longitudinal streaks, thickness variations, or non-planar areas thereon.

SUMMARY OF THE INVENTION

In accordance with the present invention, there is provided a system for optical inspection of planar glass surfaces or surfaces of other reflecting material for flatness quality wherein the lens power or focal length of curved areas appearing on the glass surfaces is measured in two directions and correlated to provide an indicia of flatness. It has been observed that non-planar areas on the glass surfaces appear as lenses and the lens power of the surface may serve as a reliable index of the flatness quality of the glass. It has been discovered that by measuring the number of fringes occurring in a lens appearing in a prescribed size area on a surface, in two directions, that is along a pair of perpendicularly disposed axes, the contour of the area can be accurately measured in terms of fringes per radial inch. Thus utilized, the lenses serve as a basis for establishing standards for grading the glass for flatness independently of human judgment.

The method for detecting the flatness of the planar glass surface generally comprises the steps of directing a collimated light beam toward a specified area on the planar surface of a glass sample, splitting the light beam into first and second pairs of beams of light for defining a predetermined size area, superimposing the two pairs of light beams one upon the other at right angles for indicating flatness in two directions along perpendicularly arranged axes defining the area, directing the first and second pairs of light beams against the surface with a predetermined relationship between the beams of each pair, directing the reflected beams from the surface to receivers at remote points and periodically sequentially chopping the reflected beams at a constant rate, photoelectrically intercepting the chopped beams for producing signals therefrom, and combining and translating the signals into an indicia of the magnitude and type of lens occurring in the inspected area of the planar glass material.

The apparatus employed to practice this method generally comprises a laser source for generating a collimated beam of light wherein the incident beam is split into two beams, each split beam further being split into a pair of incident beams of light. The two pairs of beams are superimposed one upon the other at right angles by a system of splitters and mirrors to define an area of predetermined size on the glass surface under inspection. Each pair of light beams is then reflected to its own chopper device, each chopper having a photocell producing an electrical signal of two pulses separated in time by an amount proportional to the spacing between the beams of each pair of beams as they arrive at their respective chopper. When the surface of the material being inspected is flat, there will be no change between the spacings of the reflected beams of each pair of beams at their respective chopper. However, if the inspected surface of the material is not flat or, in other words, acts as a lens, the spacing of the beams at the chopper changes in proportion to the reciprocal of the focal length of the lens appearing on the surface being inspected, with a positive or convex lens causing the beams to converge and a negative or concave lens causing them to diverge upon leaving the inspected surface. This causes a corresponding change in the time separation of the pulses from the photocells. The pulses from each photocell are suitably electronically processed and each resulting signal is displayed on its own digital meter in terms equivalent to the aforedescribed fringes per radial inch for each pair of beams. Also, the signals for the pairs of beams may be integrated and their difference displayed on a digital meter which is employed as a standard for grading the flatness of the material being inspected.

OBJECTS AND ADVANTAGES

An object of the invention is to provide an effective system for accurately measuring flatness quality of planar surfaces of reflective material and particularly surfaces of flat glass sheets.

Another object of the invention is to provide a system which determines the flatness quality of planar materials on the basis of a consistent reference standard.

Another object of the invention is to provide such a system which is durable, relatively easy to maintain, and not unduly influenced by external factors such as vibrations, air currents, dirt on the glass, and temperature variations, often encountered in the areas where such devices are conventionally located.

Still another object is to provide a system for measuring flatness quality of planar glass sheets which is independent of human evaluation so as to permit standardization of the grading.

Other objects and advantages of the invention will become more apparent during the course of the following description when read in connection with the accompanying drawings.

BRIEF DESCRIPTION OF THE DRAWINGS

In the drawings wherein like numerals are employed to designate like parts throughout the same:

FIG. 5 is a block diagram illustrating the relationship between the components of the optical and electronic systems of the invention.

DESCRIPTION OF THE PREFERRED EMBODIMENT

Figure 1:
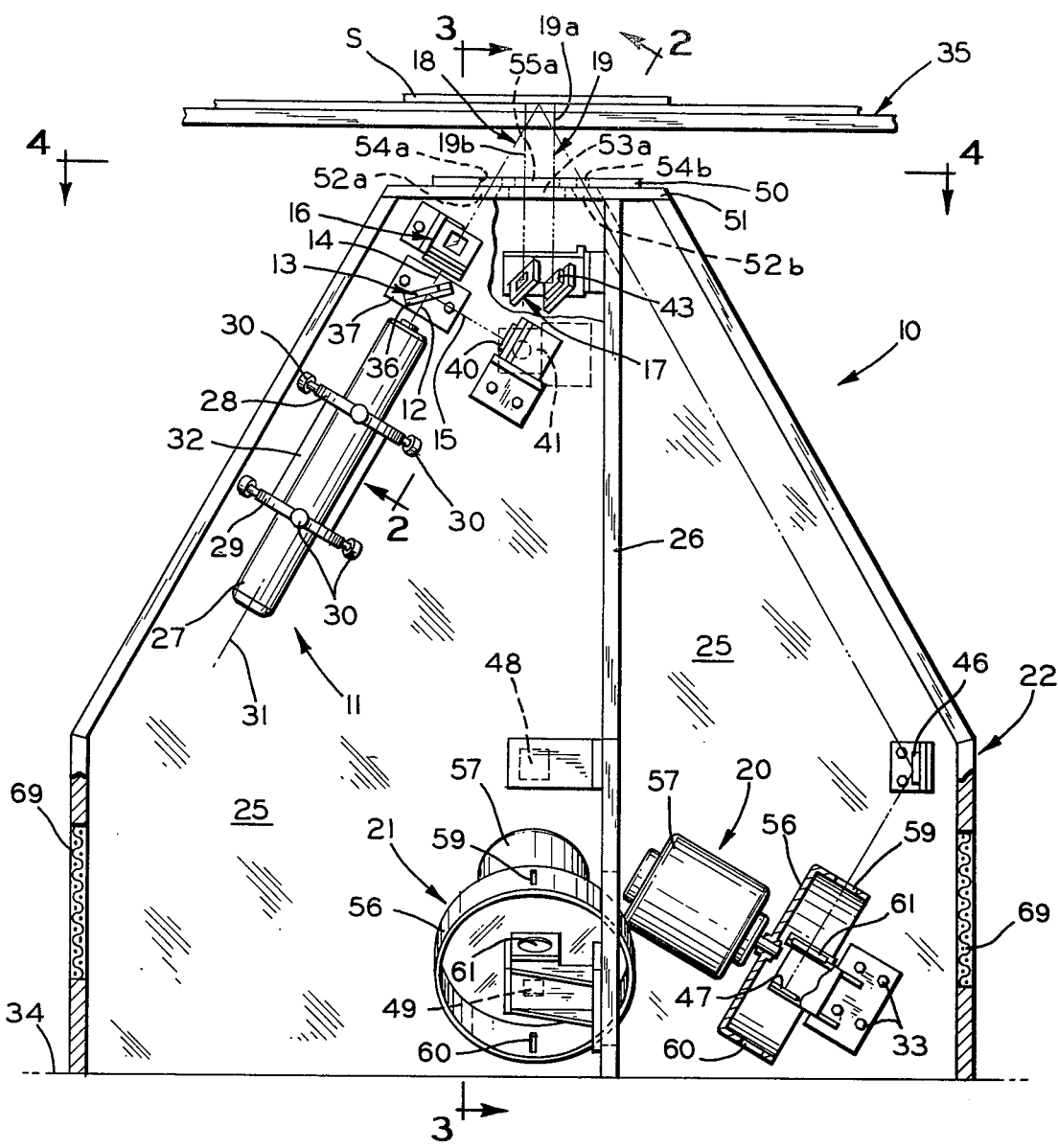
FIG. 1 is a side elevational view of a detector apparatus having a side panel removed for detecting the flatness quality of planar sheet materials and constructed in accordance with the invention.

Referring now to the drawings, particularly FIGS. 1 and 5, there is illustrated a flatness detector apparatus generally designated by the reference numeral 10 and constructed in accordance with the invention. Briefly, the apparatus 10 comprises an inspection system which includes a laser light source 11 having a light beam 12, a first beam splitter assembly 13 for splitting the light source into two light beams 14 and 15, second and third beam splitters 16 and 17 for splitting each light beam 14 and 15 into pairs of coplanar beams 18 and 19, respectively, which pairs of coplanar beams are directed to a glass sheet S to be examined in a prescribed relationship, and receivers or chopper assemblies 20 and 21 for intercepting the reflected pair of light beams. Except for the inspected glass sheet S, all of the above-mentioned components are contained within an enclosed housing 22 since slight influence upon the light beams as they travel, as by fluctuating thermal currents, can distort them and adversely affect the signals they produce. Electronic networks, generally designated by the reference numerals 23 and 24 (see FIG. 5), are provided to convert and analyze the signals produced by the chopper assemblies 20 and 21, respectively, into a useful logic.

In order to provide the two pairs of light beams with the prescribed relationship, that is superimposing the pairs of beams one upon the other at right angles, the housing 22 is provided with a pair of interior walls 25 and 26 perpendicularly arranged relative to each other and each offset from the central region of the housing 22 for a purpose which will be described in detail hereinafter.

While other conventional light sources may successfully be employed, a low power laser has been found exceptionally well suited for use in the invention in that it provides an intense, highly collimated beam of light and is relatively low in cost and maintenance. The light source 11 comprises a laser unit 27 adjustably mounted so that the light beam 12 therefrom can be properly oriented in the inspection system. To this end, the laser unit 27 is mounted in bearing rings 28 and 29 by a plurality of adjusting screws 30 for movement about its longitudinal axis 31. The bearing rings 28 and 29 are carried by a mounting base 32, which in turn is affixed to the interior housing wall 25, the mounting base 32 being secured thereto by cap screws 33. The adjusting screws 30 may be manipulated as required to position the entire laser unit 27 for adjusting purposes. The housing, as illustrated in FIG. 1, may rest upon a floor 34 for positioning the apparatus 10 in spaced relationship to the inspected glass sample S resting on a support table 35 located above the apparatus.

Figure 2:
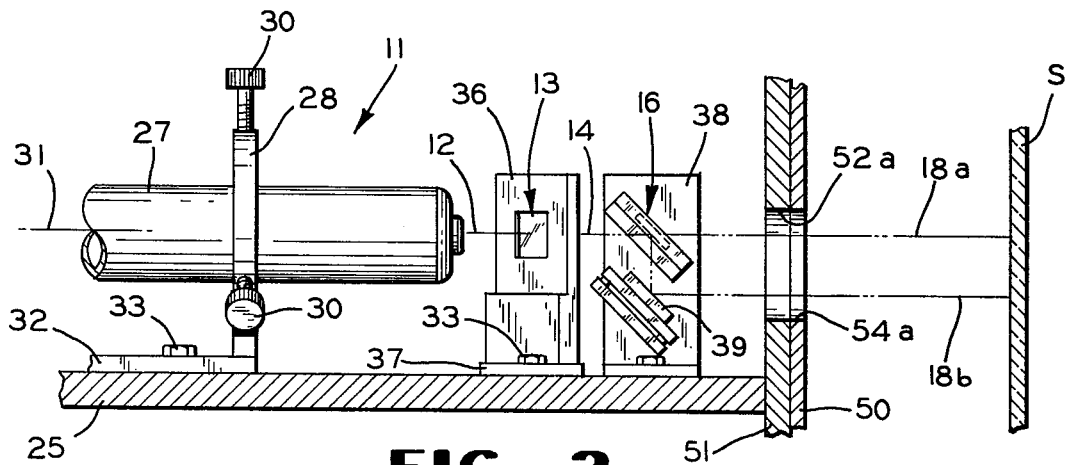
FIG. 2 is an enlarged fragmentary view taken substantially along line 2—2 of FIG. 1, partially in section, showing the light source and the beam splitter and reflecting system of one of the pair of light beams.

In order to superimpose the two pairs of light beams 18 and 19, one upon the other at right angles, the beam 12 from the laser 27 passes through the first beam splitter 13 where it is split into the beams 14 and 15 of equal intensity (FIG. 5). As best shown in FIGS. 1 and 2, the beam splitter 13 is of conventional construction and includes a mounting pedestal 36 affixed to a base 37 which in turn is secured to the interior wall 25 of the housing 22 by cap screws such as the cap screws 33, and carries the beam splitter 13 in the path of the light beam 12. As best illustrated in FIG. 5, as the beam 12 is split by the beam splitter 13, one portion continues on to become the beam 14 and the other portion is reflected off to become the beam 15.

As previously indicated, each light beam 14 and 15 is further split to provide the first and second pairs of light beams 18 and 19, the pairs of light beams being oriented by the beam splitters 16 and 17 so as to be superimposed one upon the other at right angles. Thus, the beam 14 from the first splitter 13 passes through the second beam splitter 16 where it is split into substantially parallel upper and lower beams 18a and 18b, respectively, of equal intensity (FIG. 5). As best shown in FIG. 2, the beam splitter 16 is also of conventional construction and includes a mounting pedestal 38 affixed to the interior wall 25 in the manner as previously described, and carries the beam splitter 16 in the path of the beam 14. As best illustrated in FIG. 5, as the beam 14 is split by the beam splitter 16, one portion continues on to become the upper beam 18a and the other portion is reflected downwardly and off a mirror 39 affixed to the mounting pedestal 38 to become the lower beam 18b. It is important that the beams 18a and 18b be substantially parallel, remain a known predetermined distance apart at the inspected glass sample and be vertically aligned to obtain the right angle relationship between the two pairs of beams 18 and 19.

Figure 3:
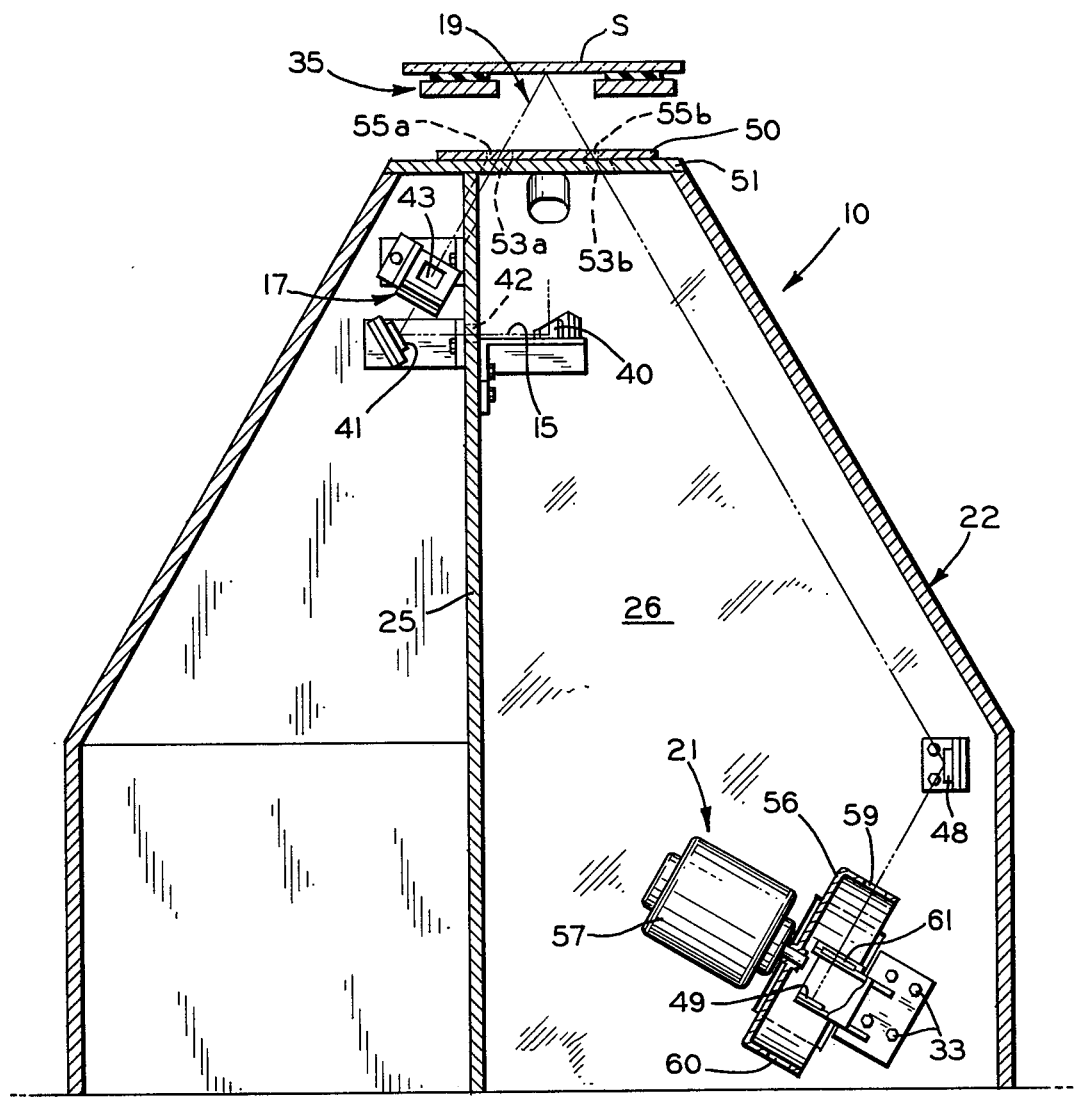
FIG. 3 is a side elevational view similar to FIG. 1 taken substantially along line 3—3 thereof and showing the beam splitter and reflecting system of the second pair of light beams.

In order to provide the right angle relationship between the first and second pairs of light beams 18 and 19, respectively, the beam 15 from the first splitter 13 is directed to a mirror 40, thence to a mirror 41 to pass through the third beam splitter 17 where it is split into substantially parallel right and left beams 19a and 19b, respectively, of equal intensity (see FIG. 5). The beam splitter 17 is of conventional design and similar in construction to the previously described splitters. As best shown in FIG. 5, the mirrors 40 and 41 and the beam splitter 17 are arranged in such a manner that the split beam 15 from the laser unit 27 impinges on the splitter 17. More specifically and as best illustrated in FIG. 3, the mirror 40 is mounted on one side of the wall 25 and the mirror 41 is mounted on the opposite side of the wall with the reflected beam 15 passing through an aperture 42 provided therein. Also, it will be noted that the splitter 17 and the mirror 41 are mounted on the same side of the wall 25. Referring now to FIG. 5, the beam 15 is split by the splitter 17, with one portion continuing on to become the left beam 19b (see FIG. 1) and the other portion being reflected back and off a mirror 43 to become the right beam 19a. It should be noted that as oriented in FIG. 5 the splitter 17 and the mirror 43 are arranged in a manner so that the beams 19a and 19b define, at their intersection with the surface of the sheet S, a horizontally disposed diametral line 44 which bisects a diametral line 45 defined by the intersection of the vertically oriented beams 18a and 18b with the surface of the sheet, the diametral lines defining the area under observation. Also, it is important that the incident beams 19a and 19b remain a known distance apart at the glass sample, be coplanar, and bisect the vertically oriented diametral line 45 for accurately establishing the right angle relationship between the two pairs of beams 18 and 19.

The sensitivity of the inspection system is basically a function of the distance between the beams at the sheet S and the distance from the sheet S to the chopper assemblies. Thus, it is only necessary for the light source 11 and the chopper assemblies 20 and 21 to be a short distance from the surface of the sheet S in order that the deflected beams be accurately resolved. For example, in the embodiment of the invention shown, the distances between the sheet S and each chopper assembly is on the order of three feet (914.4 mm). Thus, the pairs of light beams 18 and 19, reflected from the sheet S, are intercepted by reflecting surfaces which direct them to their respective chopper assembly. Accordingly, the pair of reflected, vertically disposed beams 18 is intercepted by a mirror 46 and reflected to the chopper assembly 20 where it is converted by a photocell 47 to a pulse signal which can be analyzed by the electronic network 23. The horizontally disposed pair of reflected beams 19 is intercepted by a mirror 48 and directed to the chopper assembly 21 where it is converted by a photocell 49 to a pulse signal which can be analyzed by the electronic network 24.

In order to provide consistency between the readings of the two pairs of light beams 18 and 19, it is desirable that the optical paths from the glass sheet S to their respective chopper assemblies be substantially equal in length. Accordingly, the chopper assemblies 20 and 21 are mounted within the housing 22 so that the reflected pairs of light beams 18 and 19 will travel equal distances. More specifically, the chopper assemblies 20 and 21 are mounted in the lower regions of and on the walls 25 and 26, respectively, and are arranged to intercept their respective pairs of beams 18 and 19.

In many cases only one surface of a glass sheet need be inspected for its end use, and thus the inspection system of this invention is designed to measure the reflections from only one surface of the glass sheet. In the embodiment of the invention illustrated in FIGS. 1 and 3, only the beams reflected from the bottom, or front, surface of the glass sheet S are utilized, as will be hereinafter more fully explained. It should be noted that the detector device 10 may be inverted and located over the glass sheet S to direct the light beams against the upper surface of a sheet material.

It will be appreciated that when a transparent sheet of material is being inspected, portions of the two pairs of light beams 18 and 19 will be reflected from both surfaces, that is, the front and rear surfaces of the transparent sheet. Accordingly, when the detector apparatus 10 is located below the glass sheet, as illustrated in the drawings, each pair of light beams 18 and 19 would normally be reflected from both the bottom and the top surfaces of the sheet S. Since for most purposes only one surface need be inspected to give an indication of flatness of the sheet being checked, the beams reflected from the bottom surface or surface facing the detector apparatus 10 are utilized, and the beams reflected from the top surface are blocked or diverted. Thus, the portions of the pairs of beams 18 and 19 being reflected from the top surface are prevented from reaching the chopper assemblies 20 and 21 and setting up signals which might be confused by the electronic networks 23 and 24 with the signals provided by the beams reflected from the bottom surface resulting in erroneous readings. To this end, an apertured blocking plate 50 is interposed in the path of the incident and reflected pairs of light beams and between the detector apparatus 10 and the glass sheet S, the blocking plate permitting passage of the incident light beams against the sheet S and passage of the reflected light beams from only the bottom surface of the sheet S.

Referring now to FIGS. 1 and 3, it will be noted that the housing 22 is provided with a flat top roof 51 having a first pair of aligned slots or elongated apertures 52a and 52b (see FIG. 1) and a second pair of aligned slots or elongated apertures 53a and 53b (see FIG. 3). On one hand, the slots 52a and 53a of each pair of slots permit passage of the incident pairs of light beams 18 and 19, respectively, to impinge against the surfaces of the glass sheet S. On the other hand, the slots 52b and 53b of each pair of slots permit passage of the pairs of light beams 18 and 19, respectively, reflected from the surfaces of the glass sheet S.

Figure 4:
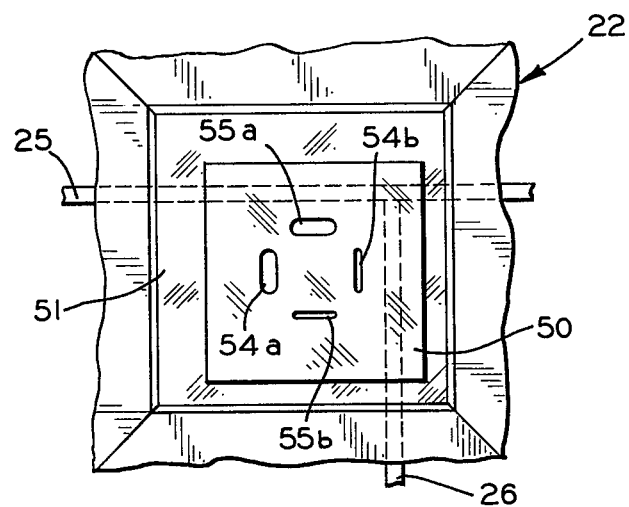
FIG. 4 is an enlarged fragmentary view looking substantially in the direction of line 4—4 in FIG. 1 showing the blocking plate employed in the invention.

Referring now to FIGS. 1, 3, and 4, the blocking plate 50 generally comprises a thin flat plate adapted to lay on the top roof 51 of the housing 22. As illustrated in FIG. 4, the blocking plate 50 is provided with two pairs of similarly shaped aligned slots 54a and 54b and 55a and 55b arranged to lie over the slots 52a and 52b and 53a and 53b, respectively, of the roof 51; the slots in plate 50 being positionable relative to slots in the roof 51. The slots 54a and 55a of each pair permit passage of the incident pairs of light beams 18 and 19, respectively, to impinge against the surfaces of the sheet S, the slots 54b and 55b of each pair of slots are of such width that only the portions of the two pairs of beams 18 and 19 reflected from the bottom surface of the sheet S pass therethrough while the portions of the beams reflected from the top surface of the sheet S impinge on the upper surface of the blocking plate 50.

Referring now to FIGS. 1 and 3, the chopper assemblies 20 and 21 are arranged and mounted on the walls 25 and 26, respectively, by screws, such as the screws 33, to intercept the pairs of light beams reflected from the mirrors 46 and 48, respectively.

As there illustrated, the choppers 20 and 21 are similar in construction and operation to the one disclosed in assignee's aforementioned U.S. Pat. No. 3,788,750. Briefly, each chopper 20 and 21 includes a drum 56 driven at a constant velocity by a motor 57. The drum includes two slits 59 and 60 spaced 180° apart and, as the drum 56 rotates, it chops or interrupts the pairs of reflected light beams 18 and 19 at a time interval proportional to the spacing between the beams of each pair. A lens 61 mounted within the drum 56 focuses the sequentially chopped beams upon the photocells 47 and 49 of each chopper 21 and 20, respectively. Each photocell produces a signal having a pair of electrical pulses spaced in time in proportion to the distance between the light beams for each half rotation of the drum, which signal is analyzed and converted into suitable logic.

Although the intensity of reflected light beams is relatively strong but, since only a small percentage of the incident light is reflected by the transparent surface of a glass sheet, and the output signals produced by the photocells 47 and 49 are inherently weak, the signals need to be amplified. In order to bring the intensities of these output signals up to a sufficient processing level, preamplifiers 62 (see FIG. 5) are employed in each of the electronic networks 23 and 24.

Generally speaking, each electronic network 23 and 24, composed of commercially available components, includes an amplifier 63 for amplification of the signal to a suitable magnitude, a differentiator 64 for accurately pinpointing the pulses of the signal, a Schmit trigger 65 for shaping and timing the signal pulses, and a signal gate 66 for allowing two pulses to pass into a converter 67 which transforms the pulses to an analog voltage. This electronic network arrangement converts the change in spacing between the light beams of each pair of light beams 18 and 19 into a suitable logic for comparison to a like logic for a prescribed flatness. As previously mentioned, the spacing between the incident light beams of each pair, at the two points where each pair strike the surface, is prescribed and constant. Thus, the spacing between the reflected beams of each pair will remain constant when the surface between the two points is flat, while a convex surface will cause the spacing between the light beams to increase and a concave surface will cause the spacing of the light beams to decrease at their respective chopper drums. Since the apparent lens on the inspected glass surface may be either concave or convex, the type of lens is indicated by positive and negative signs, respectively.

The signals from each electronic network 23 and 24 are transmitted to a digital readout meter 68 having a readout for each observed diametral line 44 and 45. Accordingly, it is desirable to provide the meter 68 with a readout for each electronic network as well as a readout for noting the difference occurring between the two readouts in terms of fringes per radial inch which is used as a standard for grading the flatness of the surface under inspection.

The sensitivity of the detector apparatus 10 is based on the spacing between the beams of each pair of beams at the inspected surface of the sheet S and the distance from the inspected surface to the chopper drums, while the accuracy of the system is based on the premise of short optical paths and relatively wide beam spacings. By way of example, it has been found that a beam spacing of one inch (25.4 mm) and optical path of three feet (914.4 mm) gives a desired degree of accuracy. In the illustrated embodiment of the invention, the sensitivity of the apparatus may be enhanced by cooling the chopper assemblies through screen openings 69 provided in the housing 22 as by a fan (not shown).

From the foregoing discussion, it may be seen that an improved inspection system is provided that gives an indication of flatness of planar sheets by observing prescribed size areas on the surface of the sheet along a pair of diametral axes positioned at right angles to each other, noting the number of fringes occurring per radial inch in the observed area, and indicating by sign whether the existing curvature is convex or concave.

It is to be understood that the form of the invention herewith shown and described is to be taken as an illustrative embodiment only of the same and that various changes in the shape, size, and arrangements of parts, as well as various procedural changes, may be resorted to without departing from the spirit of the invention.

We claim:

1. In a method of determining the flatness of a planar sheet of transparent or reflective material whose surfaces may include positive and negative lenses in the area under observation, the improvement comprising the steps of:
   (a) directing a collimated light beam toward a specified area on the surface of the sheet to be inspected;
   (b) splitting said light beam into first and second coplanar pairs of beams of light;
   (c) arranging said first and second coplanar pairs of light beams at right angles to each other;
   (d) directing said first and second pairs of light beams against said sheet with a predetermined spacing between the light beams of each pair for defining the specified area;
   (e) reflecting said first and second pairs of light beams from the specified area to first and second remote points, respectively, and periodically sequentially chopping said first and said second pairs of beams at said remote points at a constant rate for producing first and second signals;
   (f) electronically analyzing said first and said second signals; and
   (g) integrating said first and said second signals for producing a logic in terms of fringes per radial inch for the specified area.

2. A method of determining the flatness of a planar sheet of transparent or reflective material as claimed in claim 1, including the step of equalizing the lengths of paths of said first and said second pairs of light beams to said specified area and from said specified area to said first and said second remote points.

3. A method of determining the flatness of a planar sheet of transparent or reflective material as claimed in claim 1, wherein said sheet is transparent and including the step of restricting the reflections of said beams from the specified area of said sheet under inspection to one surface thereof.

4. A method of determining the flatness of a planar sheet of transparent or reflective material as claimed in claim 1, including the steps of:
   (a) photoelectrically intercepting said chopped beams of said first and said second pair of beams and producing first and second signals therefrom, each said signal comprising pulses spaced in time in proportion to the spacing between the beams of each pair of beams as they are chopped; and (b) translating the change in spacing of each said signal into an indicia of the magnitude and type of lens occurring in said specified area under inspection.

5. A surface inspection apparatus for detecting the flatness of a surface of a planar sheet of transparent or reflective material comprising (a) a light source producing a collimated beam of light;

(b) means for splitting said collimated beam into first and second beams of light;

(c) means for splitting each said first and second light beams into pairs of spaced, coplanar, incident beams of light and directing and superimposing the two pairs of said split beams, with the planes in which they lie at right angles to one another, against the surface of said sheet material;

(d) first and second photoresponsive means for receiving the first and second pairs of light beams, respectively, reflected from the surface of said sheet material and producing first and second signals in response thereto; and (e) means for electronically analyzing said first and said second signals, including means for processing said analyzed signals into a predetermined logic representing the flatness of the planar sheet of material in the area under inspection in terms equivalent to fringes per radial inch.

6. A surface inspection apparatus for detecting the flatness of a surface of a planar sheet of transparent or other reflective material as claimed in claim 5, including an enclosure containing said light source and said first and second receivers, said enclosure having a plurality of slots in one surface thereof, said one surface being arranged so that the slots permit passage of said first and said second pairs of incident light beams against the surface of said sheet material and the reflected beams thereof onto said first and said second receivers, respectively.

7. A surface inspection apparatus for detecting the flatness of a surface of a planar sheet of transparent or other reflective material as claimed in claim 6, including blocking means having a plurality of similarly arranged slots and resting on said one surface, said slots permitting passage of said incident pairs of light beams and restricting passage of said reflected pairs of light beams from one surface of the planar sheet material to said first and said second receivers.

8. Apparatus for detecting the flatness of a surface of a planar sheet of transparent or reflective material as claimed in claim 5, wherein said light source is a low power laser and said means for splitting the light source into first and second beams includes a first beam splitter and mirror arrangement.

9. Apparatus for detecting the flatness of a planar sheet of transparent or reflective material as claimed in claim 5, wherein said means for splitting said first light beam into said pair of substantially parallel incident beams of light includes a second beam splitter and mirror arrangement for directing said pair of incident light beams in a horizontal plane against said sheet material.

10. Apparatus for detecting the flatness of a planar sheet of transparent or reflective material as claimed in claim 9, wherein said means for splitting said second light beam into said pair of substantially parallel incident beams of light includes a third beam splitter and a plurality of mirror arrangements for directing said second pair of incident light beams in a vertical plane against said sheet material and superimposing them at right angles to said pair of light beams disposed in the horizontal plane.

11. Apparatus for detecting the flatness of a planar sheet of transparent material or other reflective material as claimed in claim 10, including at least two mirrors interposed between said first beam splitter and said third beam splitter.

* * * * *